(No Model.)  3 Sheets—Sheet 1.

F. E. HERDMAN.
ELECTRIC MOTOR.

No. 519,116.  Patented May 1, 1894.

WITNESSES:
David S. Williams
Frank S. Busser

INVENTOR:
Frank E. Herdman
by his atty.
S. H. Herding (No Model.) 3 Sheets—Sheet 2.
F. E. HERDMAN.
ELECTRIC MOTOR.
No. 519,116. Patented May 1, 1894.
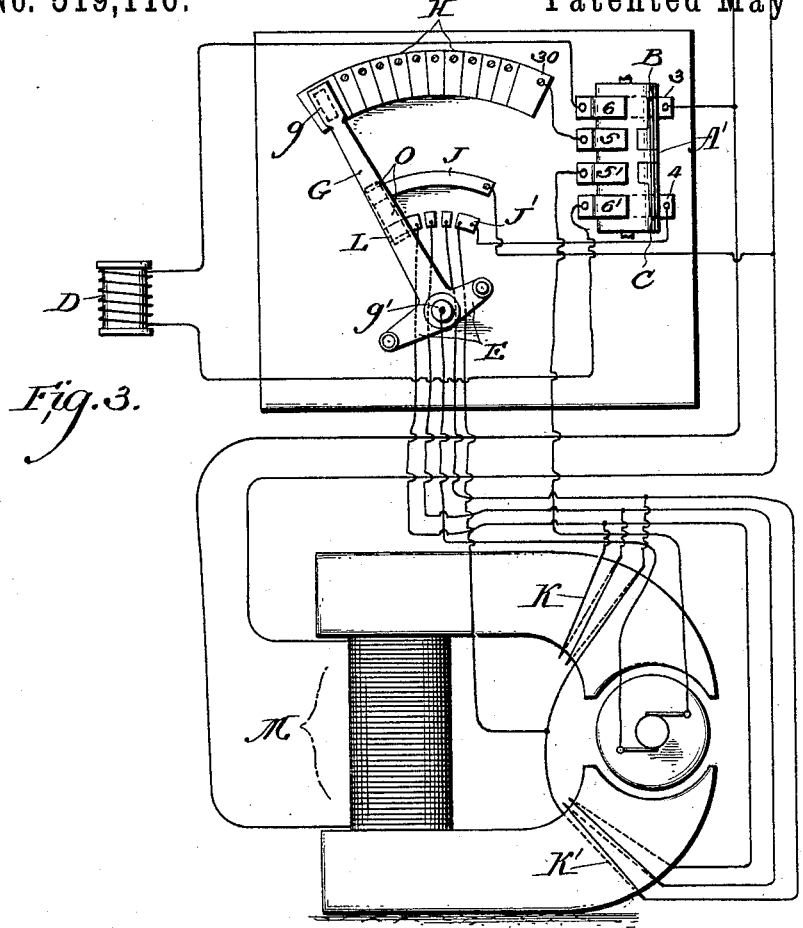
Fig. 3.
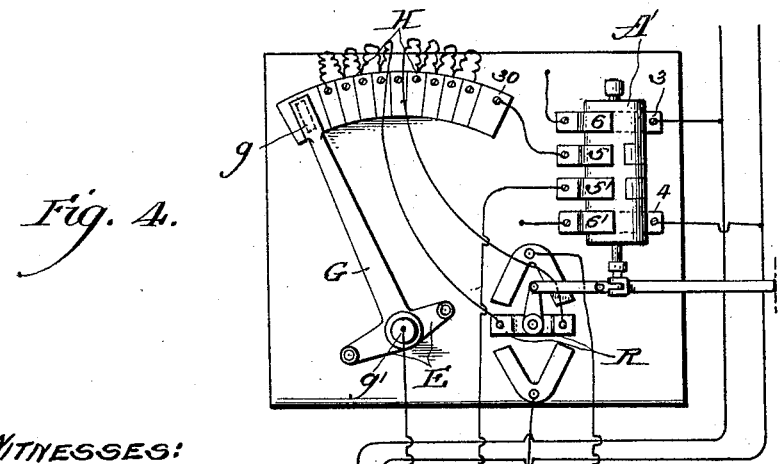
Fig. 4.
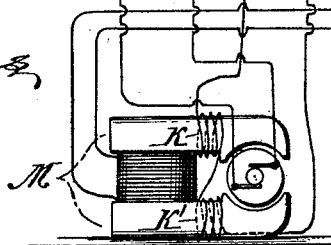
WITNESSES:
David S. Williams
Frank S. Busser
INVENTOR:
Frank E. Herdman
by his Atty
S. H. Harding (No Model.) 3 Sheets—Sheet 3.

F. E. HERDMAN.
ELECTRIC MOTOR.

No. 519,116. Patented May 1, 1894.

WITNESSES:
David S. Williams
Frank S. Busser

INVENTOR:
Frank E. Herdman
by his atty

UNITED STATES PATENT OFFICE.

FRANK E. HERDMAN, OF INDIANAPOLIS, INDIANA.

ELECTRIC MOTOR.

SPECIFICATION forming part of Letters Patent No. 519,116, dated May 1, 1894.

Application filed July 19, 1892. Serial No. 440,457. (No model.)

*To all whom it may concern:*

Be it known that I, FRANK E. HERDMAN, a citizen of the United States, residing at Indianapolis, county of Marion, and State of Indiana, have invented a new and useful Improvement in Electric Motors, of which the following is a full, clear, and exact description, reference being had to the accompanying drawings, which form a part of this specification.

The object of this invention is to give better control and greater efficiency in the consumption of the current for the operation of electric motors in use with elevators or, when they are subject to being continually stopped, started and reversed. One of the difficulties to be overcome, especially with elevators, is the great strain upon the main circuit and the central station when starting. Thus the moment the armature of the motor commences to revolve after the current is turned on it, an excessive amount of current is liable to pass through it, causing a momentary strain upon the power supplying the current. As soon as the armature commences to revolve, this strain is gradually reduced until the motor obtains its speed.

My invention broadly consists in giving to the fields excessive strength at the time the current is thrown on the motor, and the armature thus revolves that much quicker, and also obtains its speed in much less time, than if the fields were not strengthened, thereby reducing the strain on the power station. Of course this greater strength of the fields, if maintained, would prevent the motor from running at its full speed. Consequently the strength of the fields is reduced as the motor increases its speed to the maximum, at the same time affording the means of reducing to the minimum the strain upon the power station in starting.

I will describe my invention as adapted for use with an elevator, but I do not intend to limit its uses, as it can be used, as has hereinbefore been clearly pointed out, where the motor is used for purposes other than operating an elevator.

Figure 1:
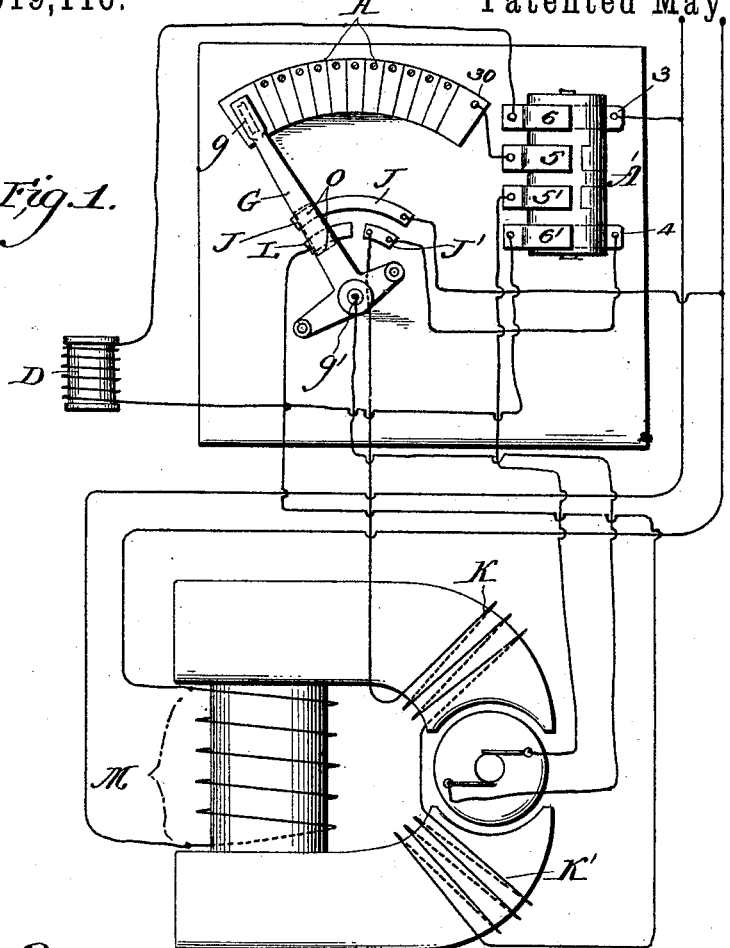
Figure 2:
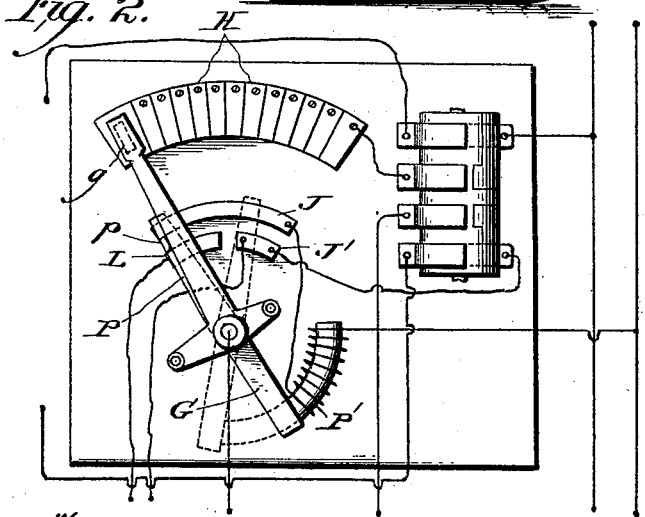
Figure 3:
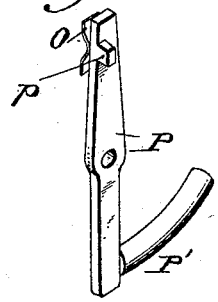
Figure 5:
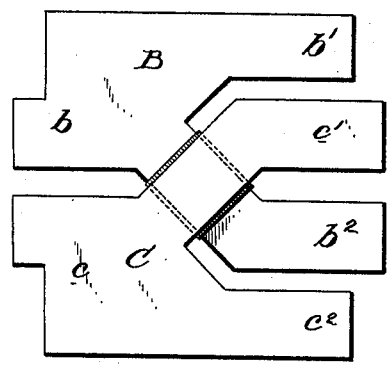
Figure 6:
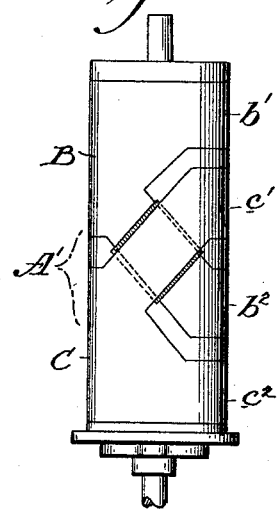
Figure 7:
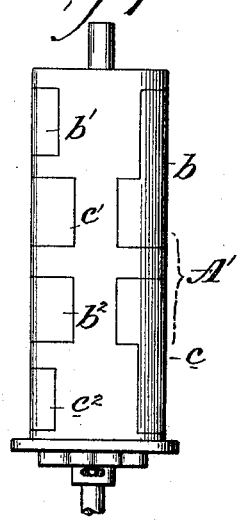
Figure 8:
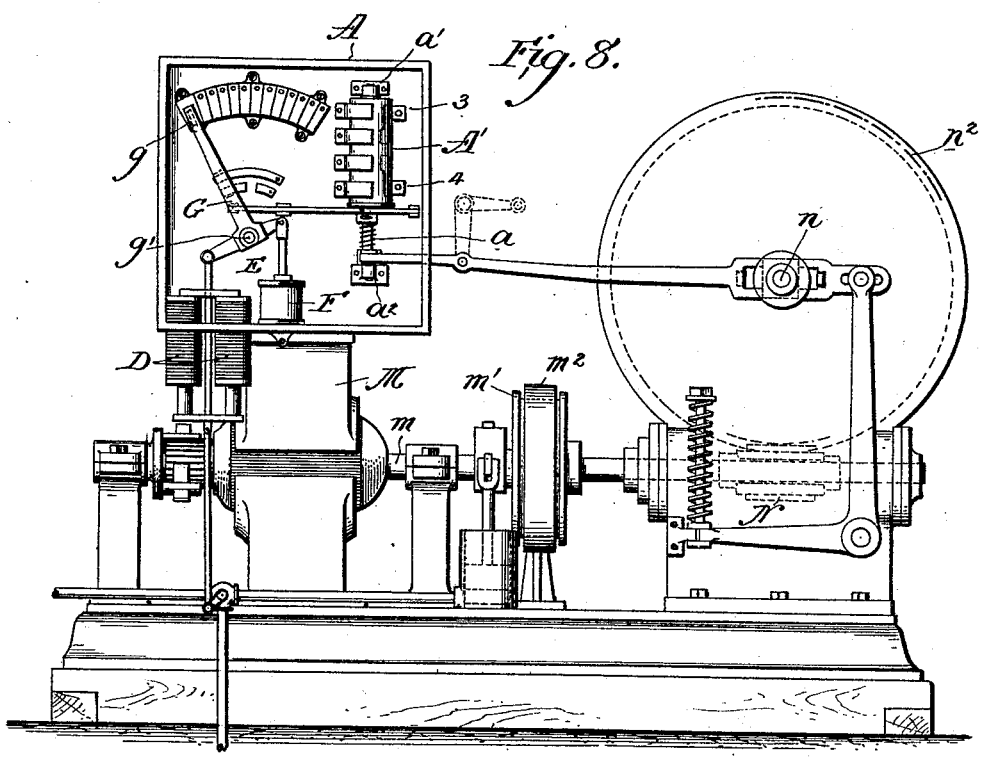

In the drawings—Figure 1 is a diagrammatical view. Fig. 2 is a diagrammatical view of modified form. Fig. 3 is a diagrammatical view showing numerous connections. Fig. 3* is a detached perspective view of a part of mechanism shown in Fig. 2. Fig. 4 is a diagrammatical view of modified form. Fig. 5 is a detail view of plate of switch. Fig. 6 is a detail view of switch and switch roller. Fig. 7 is a detail view of switch and switch and roller. Fig. 8 is a front elevation showing connection with elevating apparatus.

M is the motor with the shaft $m$. On the shaft is the brake wheel $m'$ provided with a strap brake $m^2$. Connected to the shaft $m$ is the worm N which operates the worm wheel on the drum shaft $n$, upon which shaft is also the operating drum $n^2$.

A is the rheostat box. In this box is the wooden drum A', loose on a shaft $a$, having bearings $a'$, $a^2$. This drum has upon its face two plates B and C, shown in detail in Figs. 5, 6 and 7. These plates are of peculiar shape and wound around the drum in a peculiar manner. Thus the plate B has a solid portion $b$ at one end, while at the other end it is formed into two portions $b'$, $b^2$, separated by a space. The plate C in a similar manner has at one end the solid portion $c$, and at the other end the two portions $c'$ $c^2$, separated by a space. These plates are wound around the drum in a peculiar manner so that they cross one another, as shown in Figs. 6 and 7. At their point of passing, the two plates are separated by an insulated strip. Beneath the drum A', and in contact with the same, are the two brushes 3 and 4, one in contact with plate B and the other in contact with plate C. The brush 3 is connected directly with the main circuit, the brush 4 being in direct electrical connection with the other pole of the current supply, the field coils of the motor being also in direct electrical connection with the source of current supply. In contact with the top of the cylinder A' are the brushes 5, 5', and 6, 6'. The brushes 6, 6', are in electrical connection with the solenoid D. Brush 5 is in electrical connection with contact 30, and the other brush 5' is in electrical connection with the armature of the motor.

E is an arm connected at one end to the solenoid core and at the other to a dash pot F.

G is an arm connected to the arm E, and carrying a brush g.

H are the resistances, and the arm G from the point g' is in electrical connection with the armature, and has brush g, so that through the resistances and the arm G, brush 5 is in electrical connection with the armature of the motor.

The main electric circuit, instead of being directly connected with the brush 4, is connected with contact J, and the brush 4 is connected with contact J'. Around the poles of the motor are wound the coils K, K', and the coil K is in electrical connection with contact J', the other coil being in electrical connection with contact L. Connected to the arm G and insulated thereupon is the brush O. This brush when the arm G is to the extreme left and at a point where the main circuit is cut out is in contact with contacts J and L. When the current is thrown on to the armature the solenoid is electrified which causes the arm G to travel over the resistances, and when it comes in contact with the first resistance the circuit through the armature is completed as follows: The current passes into the operating switch A', from there through the brush 5 to the resistance coils H, through the arm G down to the armature; from the other side of the armature to brush 5' and from there by the cylinder A' to the contact J' and from contact J' to and through the coils K K' to the contact L, and by the brush O connected with the contact J and from there to the main circuit. By these connections the field magnet not only has its usual strength due to the regular wiring of the fields, but also the extra strength due to the entire armature current passing through the coils K K', thus giving the fields excessive strength at their time of starting. By connecting these coils K K' with the main circuit before connecting it with the reversing switch I am enabled to maintain the current through the coils K K' continually in the same direction, regardless of the reversing of the current through the armature. The contact L is made of the desired length so that the coils K K' will be retained in circuit until the arm G has passed a distance over the resistances H to give the best results. In line with the contact L is placed the contact J' and as the brush O leaves the contact L it also comes in contact with contact J' being well in contact with contact J' before leaving contact L. As soon as the brush 6 comes in contact with contact J' and leaves the contact L, the coils K K' are cut out of circuit, the current then passing from the contact J' through the brush O to the contact J, from thence to the operating switch, instead of through the coils K K'. When the coils K K' are cut out the strength of the fields of the motor has been reduced to the desired point for its maximum speed and consequently the motor gains that speed without interruption. The point at which the coils K K' are cut out is governed entirely by the best results obtained in the motor gaining its speed. This can be done gradually by having a number of connections between the coil K' and contact L, as shown in Fig. 3 and one layer at a time of the coils K K' can thus be cut out, thus gradually reducing the strength of the fields. Instead of attaching the brush O directly to the arm G I can connect said brush to an arm P, which operates by an independent solenoid P', the electrical connection between contact J and source of current supply being through said solenoid. The arrangement is such that when the core of the solenoid P' is drawn in the brush is in contact with the contacts L and J, thereby maintaining the coils K K' in circuit. The amount of current at which the core of solenoid P' is held in being governed by the extreme amount it is desired should pass through the main circuit. Thus when the motor is under the greatest strain to obtain motion, and draining the greatest amount from the main circuit the coils K K' are retained in the circuit thereby giving excessive strength of the fields so as to aid the motor in obtaining this motion. When in consequence of the motor having obtained its speed the current drawn from the main line falls below this maximum point the solenoid weakens and the brush O is brought in contact with contacts J J' by the weight of the solenoid core, thereby throwing the coils K K' out of circuit and allowing the motor to gain its full speed. The brush O is so located that when the arm G returns to the extreme left, when throwing the motor out of circuit, it raises the solenoid core by striking the projection p on the arm P and brings the brush O in contact with contacts L and J, so that as soon as current is admitted to the motor it passes through the coils K K'.

Instead of using contacts L, J and J', I can admit the current directly to both brushes 5, 5' and between any two contacts on the rheostat face, these contacts to be governed by the best results to be obtained, can be connected the coils K K', (see Fig. 4) so that prior to the passage of the arm G beyond these contacts, the main current will be admitted through the coils K K', and after the arm G has passed these contacts the coils K K' would be cut out of the circuit. This arrangement necessitates an auxiliary switch R connected with the operating bar, so that a reversal of the main switch will reverse this auxiliary switch R, also, thereby maintaining the current passing through the coils K K' constantly in the same direction.

Having now fully described my improvement, what I claim, and desire to protect by Letters Patent, is—

1. The hereinbefore described method of operating a motor provided with extra field winding, which consists in admitting current to the regular winding of the field in a circuit parallel to the armature circuit and to the extra winding in a circuit parallel with the circuit to the regular field winding initially admitting current to the armature through resistance and cutting out said extra field winding as the resistance is cut out of the circuit to the armature.

2. The hereinbefore described method of operating a motor provided with extra field winding which consists in admitting current to the regular winding of the field in a circuit parallel to the armature circuit and to the extra winding in a circuit parallel with the circuit to the regular field winding, initially admitting current to the armature through resistance, and cutting out said extra field winding gradually as the resistance is cut out of the circuit to the armature.

3. The hereinbefore described method of operating a motor provided with extra field winding, which consists in admitting current to the regular winding of the field in a circuit parallel to the armature circuit and to the extra winding in a circuit parallel with the circuit to the regular field winding, initially admitting current to the armature through resistance, and regulating the amount of said extra winding in action, proportional upon the amount of resistance in said circuit to armature.

4. The combination of a motor provided with extra field winding, a source of current supply, electrical connection with the armature of the motor, resistance in said circuit, an arm for controlling said resistance, a device for throwing said extra field winding in and out of circuit, and connection between said device and the resistance arm, the connection being such that the circuit is closed to the extra winding when the greatest resistance is in the armature circuit, and electrical connection with the regular field winding independent of the circuit to the armature.

5. The combination of a motor provided with extra field winding, a source of current supply, electrical connection with the armature of the motor, resistance in said circuit, an arm for controlling said resistance, a device for throwing said extra field winding in and out of circuit, and means to operate said device to open the circuit to the extra field winding when the resistance arm moves in one direction, and to close said circuit when the arm moves in the other direction, and electrical connection with the regular field winding independent of the circuit to the armature.

6. The combination of a motor provided with extra field winding, a source of current supply, electrical connection with the armature of the motor, resistance in said circuit, an arm for controlling said resistance, a device adapted in its movement in one direction to gradually cut the extra field winding out of action, and in the other direction to gradually throw said winding into action, and means to cause said device to move in the direction to cut out said extra field winding when the resistance arm moves in the direction to cut out the resistance in the armature circuit and in the direction to throw said extra winding into circuit when the resistance arm moves in the direction to throw resistances into the armature circuit, and electrical connection with the regular field winding independent of the circuit to the armature.

7. The combination of a motor provided with extra field winding, a source of current supply, electrical connection with the armature of the motor, resistance in said circuit, a device for throwing said extra field winding in and out of circuit, said device being thrown into action to cut out said extra winding when the resistance in the armature circuit is reduced.

8. The combination of a motor provided with extra field winding, a source of current supply, electrical connection with the armature of the motor, resistance in said circuit, a device adapted in its movement in one direction to gradually cut the extra winding out of circuit, and in the other direction to gradually throw said extra winding into circuit, said device being rendered active and caused to move in the direction to cut out the extra winding when the resistance in the armature circuit is decreased and to move in the other direction when the resistance in the armature circuit is increased, and electrical connection with the regular field winding independent of the circuit to the armature.

9. The combination of a motor provided with extra field winding, a source of current supply, electrical connection between said source of current supply and extra field winding, a device for throwing said extra winding in and out of circuit, a solenoid in circuit with the source of current supply to operate said device, and adapted when said solenoid is energized to throw said coils in circuit, said solenoid being adjusted to the extreme current strength desired in main circuit, and electrical connection between the source of current supply and armature and regular field winding.

10. In combination a source of current supply, a motor provided with coils around the field magnets electrical connection between the source of current supply and the field coils of said motor, a switch, direct electrical connection between said switch and one pole of said source of current supply, a resistance, electrical connection between said switch and the resistance, an arm in electrical connection with the armature of the motor adapted to travel over and be in electrical connection with said resistances, direct electrical connection between the switch and the armature, a contact in direct electrical connection with the switch, a contact in direct electrical connection with the source of current supply, a contact in electrical connection with the other coil of the field magnet, a brush carried by said arm adapted to travel over the resistances, said brush being adapted to travel over and be in electrical connection with either the contact in electrical connection with the source of current supply and the contact in electrical connection with one of the coils, or the contact in direct electrical connection with the source of current supply and the contact in electrical connection with the switch.

11. In combination a source of current supply, a motor provided with coils around the field magnets, direct electrical connection between the field coils and source of current supply, a switch, brushes, as 3, 4, 5, 5', a resistance, electrical connection between one pole of the current supply and brush 3, electrical connection between the armature of the motor and brush 5', electrical connection between brush 5 and the resistances, a contact in electrical connection with the source of current supply, a pole opposite to that connected to the brush 3, a contact in electrical connection with one of the coils of the field magnet, a contact in electrical connection with the other coil of the field magnet and with brush 4, an arm adapted to travel over said resistances, said arm being in electrical connection with the armature of the motor, a brush carried by said arm, and adapted to travel over said contacts and to be at one time in connection with contact in electrical connection with the source of current supply and contact electrical connection with one of the coils or contact in electrical connection with the source of current supply and contact in electrical connection with brush 4.

12. In combination a source of current supply, a motor provided with coils around the field magnet, direct electrical connection between said source of current supply and the field coils of said motor, a switch, brushes as 3, 4, 5, 5', electrical connection between one pole of the source of current supply and brush 3, a resistance, electrical connection between brush 5 and said resistance, electrical connection between brush 5' and the armature of the motor and contact as J in electrical connection with the other pole of the source of current supply, and contact as J' in electrical connection with brush 4 and also in electrical connection with one of the coils of the field magnet and contact as L in electrical connection with the other coil of the field, an arm carrying a brush adapted to travel over the resistances and in electrical connection with the armature and brush as O carried by and insulated from said arm and adapted to travel over and be in contact with either contacts J and L or J' and J.

13. In combination a source of current supply, a motor provided with coils around the field magnet, electrical connection between the source of current supply and the field coils of said motor, a switch, direct electrical connection between said switch and one pole of said source of current supply, a resistance, electrical connection between said switch and the resistance, a contact, electrical connection between said contact and one of the coils of the field magnet, an arm carrying a brush adapted to pass over said resistances, said arm being in electrical connection with the armature of the motor, and contact in electrical connection with the other coil of the field magnet and in electrical connection with the switch and solenoid and contact in electrical connection with said solenoid core, said solenoid core being in electrical connection with the source of current supply, an arm carried by said solenoid core, said arm being in electrical connection with the resistance arm, a brush on said arm adapted to travel over and rest against either the contact in electrical connection with one of the coils and the contact in electrical connection with said solenoid core or the contact in electrical connection with said solenoid core and the contact in electrical connection with the switch and the other coil of the field magnet.

14. In combination a source of current supply, a motor provided with coils around the field magnets, direct electrical connection between said source of current supply and the field coils of said motor, a switch, brushes as 3, 4, 5, 5', electrical connection between one pole of the source of current supply and brush 3, a resistance, electrical connection between brush 5 and said resistances, electrical connection between brush 5' and the armature of the motor, and contact as J' in electrical connection with brush 4 and with one of the coils of the field magnet, a contact as L in electrical connection with the other coil of the field magnet, an arm carrying a brush adapted to pass over said resistances, said arm being in electrical connection with said armature and solenoid, an arm carried by said solenoid core, the core of said solenoid being in direct electrical connection with one pole of the source of current supply, a contact as J in electrical connection with said solenoid core, the arm carried by said solenoid core being in electrical connection with the resistance arm, a brush upon said solenoid core arm adapted to rest against contact J and L or contact J and J'.

15. In combination a source of current supply, a motor provided with coils around the field magnets, direct electrical connection between the field coils and source of current supply, a switch, brushes as 3, 4, 5, 5', a resistance, electrical connection between one pole of the current supply and brush 3, electrical connection between the armature of the motor and brush 5, 5' electrical connection between brush 5 and resistance, an arm carrying a brush adapted to travel over said resistance, said arm being in electrical connection with the armature a contact in electrical connection with one of the coils, a contact in electrical connection with the other coil and with brush 4, a solenoid, electrical connection between the core of said solenoid and the source of current supply, an arm carried by said solenoid core, a contact in electrical connection with the solenoid, said arm carried by said solenoid core being in electrical connection with the resistance arm, a brush upon said solenoid arm adapted to travel over and rest against both contact in electrical connection with the solenoid core and contact in electrical connection with one of the coils, or contact in electrical connection with the solenoid core and contact in electrical connection with the switch and with the other coil.

In testimony of which invention I have hereunto set my hand.

FRANK E. HERDMAN.

Witnesses:
W. L. ROBINSON,
W. V. MARTIN.